Sept. 1, 1953  R. L. JOHNSON  2,650,447
FISHING LINE GUIDE
Filed July 5, 1950
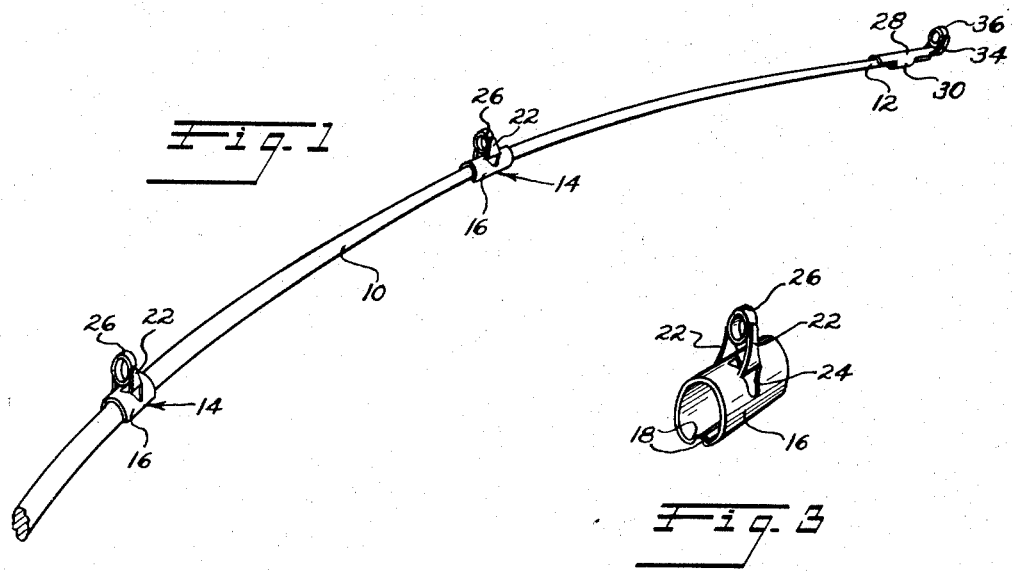
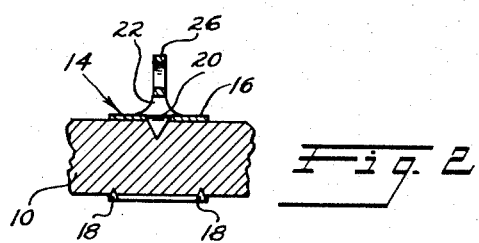
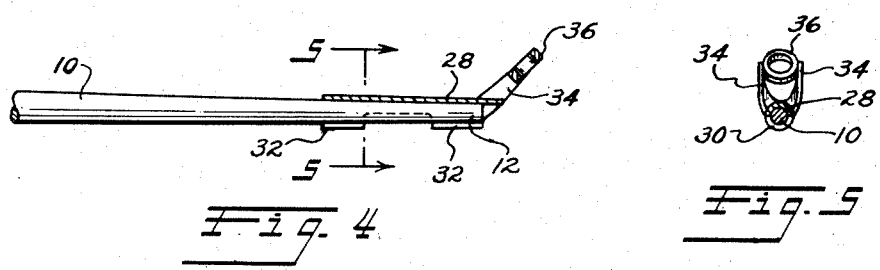
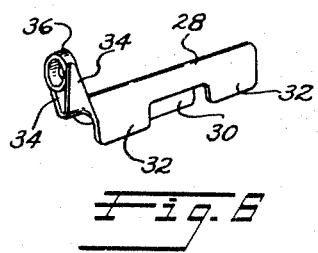
INVENTOR
*Robert L. Johnson*
BY *Strauch, Nolan & Diggins*
ATTORNEYS Patented Sept. 1, 1953

2,650,447

UNITED STATES PATENT OFFICE 2,650,447

FISHING LINE GUIDE

Robert L. Johnson, Unity, Wis.

Application July 5, 1950, Serial No. 172,119

2 Claims. (Cl. 43—24)

This invention relates to fishing line guides and has for its general object and purpose to provide line guides of novel construction which may be easily, quickly, and securely applied at spaced intervals to a fishing pole with the several line guiding eyes in accurate radial position with respect to the axis of the fishing pole.

It is a more particular object of the invention to provide a fishing line guide embodying a body member of resilient sheet metal of semi-cylindrical C-shaped form adapted to expand under pressure and then snap tightly around the pole together with a line guiding eye rigidly carried by said member.

It is a further object of the invention to provide the resilient expansible body member with angularly projecting spaced parts thereof forming spurs adapted to bite into the fishing pole and positively lock said member against either rotative or axial movement on the pole from its applied position.

It is an additional object of the invention to provide supporting elements between which the line guiding eye is rigidly mounted which comprise ears preferably of triangular shape struck outwardly from the sheet metal body member.

It is a further object of the invention in another embodiment thereof to provide a line guide for the tip end of a fishing pole having a body member of concave or convex form with pole clamping ears in longitudinal alternating relation along the opposite sides of said member together with transversely spaced upstanding supporting elements at one end of the body member having the line guiding eye supported by their free ends and soldered thereto.

It is a further general object of the invention to provide a fishing line guide as above characterized which may be fabricated at very low cost and will be of neat and attractive appearance when applied to a fishing pole.

With the above and other objects in view, the invention comprises the improved fishing line guide, as hereinafter more fully described, illustrated in the accompanying drawings, and subsequently incorporated in the subjoined claims.

In the drawings wherein I have disclosed several simple and practical embodiments of the invention and in which similar reference characters designate corresponding parts throughout the several views:

Figure 1 is a fragmentary perspective view of a fishing pole having my improved line guides applied thereto;

Figure 2 is a longitudinal sectional view showing the resilient "snap-on" guide secured on the pole;

Figure 3 is a perspective view thereof;

Figure 4 is a longitudinal sectional view showing the line guide for the tip end of the pole in its applied position;

Figure 5 is a transverse sectional view taken substantially on the line 5—5 of Fig. 4; and Figure 6 is a perspective view of the tip end line guide.

Referring in further detail to the drawings and more particularly to Figures 1, 2 and 3 thereof, I have shown a portion of a fishing pole 10 which progressively decreases in diameter to its tip end, indicated at 12 and may preferably be formed of bamboo. At spaced intervals along the bamboo pole, and between its end line guiding members made in accord with this invention and generally indicated at 14 are applied. Each of these members is of the "snap-on" type and comprises a clamping member in the form of a sleeve 16 of resilient sheet metal. This sleeve is of semi-cylindrical or C-shaped form as clearly seen in Figure 3 of the drawings and each of its opposed longitudinal edge portions is provided at its opposite ends with an inwardly projecting attaching spur portion 18. Sleeve 16 also is provided with a single centrally disposed, struck out, internally projecting attaching spur 20. These spurs 18 and 20 are adapted to more or less deeply bite into pole 10 so that the sleeve 16 will be securely held against either rotational or longitudinal shifting movement on the pole.

At opposite sides of the indented spur 20, supporting elements in the form of triangular shaped ears 22 are struck outwardly from the metal sleeve 16 leaving the openings 24 therein as shown in Figure 3. The ends of these outwardly struck ears 22 are soldered to a line guiding eye 26 at diametrically opposite points.

Preferably the opposed longitudinal edges of the C-shaped sleeve 16 are disposed so that when said sleeve is applied under pressure on pole 10, these opposed edges will bear on the opposite sides of the pole and spring the sleeve open. The metal sleeve 16 is thereby expanded and as the opposed edges of said sleeve move inwardly beyond the central portion of the pole, the sleeve contracts to tightly grip the periphery of the pole and draw the spur portions 18 and 20 of said sleeve into the surface of the pole to thus positively lock the sleeve in its applied position. In this manner, the spaced line guide members 14 may be easily and quickly applied to the pole with the guide eyes 26 located in proper radial relation to the axis thereof and in accurate alignment longitudinally of the pole.

In Figures 4 to 6 of the drawings, I have shown a modified embodiment of the line guide which is designed for application to the tip end 12 of the fishing pole. This tip end line guide comprises a longitudinally elongated sheet metal body member 28 of concavo-convex form in cross-section. Projecting from the concave side of said member midway of one longitudinal side is a single central pole clamping ear 30, while on the opposite longitudinal edge portion of said member, there are spaced pole clamping ears 32 formed in longitudinal alternating relation with the ear 30.

One end of member 28 is provided with angularly projecting, transversely spaced supporting elements 34 which, at one of their ends, are directly joined with each other and also integrally joined with the longitudinal edge portions of the body member 28 as most clearly seen in Figure 6 of the drawings. The line guiding ring eye 36 is mounted between the free ends of the supporting elements 34 which are rigidly welded at diametrically opposite points thereto.

In applying the member 28 to the tip end 12 of the pole, the pole end is engaged in the concave seat of said member, and by means of pliers or other suitable tool, the ear 30 on one edge of said member is bent inwardly in one direction, while the ears 32 on the other edge of said member are bent inwardly in the opposite direction. The ears 30 and 32 are thereby caused to tightly grip and clamp the peripheral surface of the pole tip securely fixing the member 28 in properly adjusted position with the line guide eye 36 thereof in accurately aligned relation with the guide eyes 26 of the spaced members 14 secured on the pole 10.

From the foregoing description and the accompanying drawings, it is thought that the several novel features of my improved fishing line guides will be readily understood. The body members of the described embodiments of the invention may be rapidly fabricated by means of sheet metal stamping dies of very simple construction so that production cost will be reduced to a minimum. These sheet metal members can be either nickel or chrome plated to enhance the appearance thereof and protect them from rusting when applied to the fishing pole. Since my improved line guides, when applied in the manner above described to the pole, insure the free and accurately guided movement of the fishing line relative to the pole, the pole may be satisfactorily used or manipulated in well known manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A line guide for fishing poles comprising a resilient flat metal clamping member open at its ends, a pair of longitudinally spaced supporting elements in the form of substantially triangular ears struck outwardly from said member intermediate the side edges thereof, a line guide eye disposed between and secured to said ears and a substantially triangular attaching spur for said member struck inwardly from said member intermediate said ears and extending transversely of said member.

2. A line guide for fishing poles as defined in claim 1, together with secondary attaching spurs projecting inwardly from the side edges of the clamping member adjacent the ends thereof to prevent relative separation of said ends.

ROBERT L. JOHNSON.

References Cited in the file of this patent

UNITED STATES PATENTS

| Number | Name | Date |
|---|---|---|
| 734,544 | Hall | July 28, 1903 |
| 971,519 | Brannen | Oct. 4, 1910 |
| 2,227,868 | Tengel | Jan. 7, 1941 |

FOREIGN PATENTS

| Number | Country | Date |
|---|---|---|
| 20,228 | Great Britain | 1892 |